INVENTOR
F. G. BUHRENDORF
BY
ATTORNEY

INVENTOR
F. G. BUHRENDORF
BY
ATTORNEY

United States Patent Office 2,882,518

Patented Apr. 14, 1959

2,882,518

MAGNETIC STORAGE CIRCUIT

Frederick G. Buhrendorf, Westfield, N.J., assignor to Bell Telephone Laboratories, Incorporated, New York, N.Y., a corporation of New York Application February 13, 1956, Serial No. 565,063

16 Claims. (Cl. 340—174)

This invention relates generally to magnetic drum information storage systems and particularly to writing and reading methods and circuits for use in such systems.

The use of magnetic drums for the storage of digital information thereon in the form of induced magnetizations is well known and such storage means have found wide application as, for example, in the digital computer field. Generally, binary coded information is stored by the appropriate energization of a recording head to induce a representative magnetization of virtual saturation in the magnetic drum surface, there being two discrete states of magnetic saturation available to represent a binary digit. The surface area of the drum is normally divided into cells which are coordinately arranged in tracks and slots, each cell being the area within which a particular bit of information is defined. Assuming a plurality of recording heads, a track designates the series of cells passing under any single head as the storage drum is rotated and a slot designates all of the cells, one in each track, appearing adjacent to the respective heads at a given moment.

The first step in the recording process generally is to magnetize the entire track in which information is to be stored to saturation in one direction, this direction being conveniently referred to as negative. All of the cells in this track at this time may be further thought of as each containing a "0" information bit in binary numbering. When a binary "1" is to be recorded in a particular head, a current pulse of suitable polarity is passed through a winding of the recording head at the moment when the particular cell is adjacent to the tip of the head thereby producing a condition of saturation in the opposite or positive direction. A binary "1" may be erased from a cell by simply applying a current pulse of opposite polarity to the recording head at the proper time thereby restoring the cell to its original negative or "0" condition of polarization.

The information stored in a cell is read when the cell passes a reading head; a "0" condition of magnetization inducing one voltage form of essentially zero amplitude in the reading head and a "1" condition of magnetization inducing another voltage form of significant amplitude in the reading head. By means of suitable associated information processing circuits the information thus read out of a particular cell may be compared with other information to determine whether the information in the cell should be altered or returned unaltered to the particular cell.

Obviously, the number of information bits which may be stored in a particular track is limited by the circumference of the storage drum, the size of the cell, and the spacing between the cells. Generally, in known magnetic drum storage arrangements two systems of recording have been employed. One, the return-to-zero method, mentioned above, returns the area between successive cells in a track to the negative saturation condition before again recording a "1" condition where such a "1" condition follows immediately upon a preceding "1" condition. In the other method, the non-return-to-zero method, the spacing between the cells is so reduced that in the case of the recording of a succession of "1's" the positive magnetic condition of each cell containing a "1" is carried over to the following cell also containing a "1." The area between two cells in the track in which consecutive "1" conditions appear is thus effectively bridged. In the latter method due to the reduction in intercell spacing storage drum capacity is substantially increased without an increase in drum diameter. This advantage is largely offset, however, by the inherent unreliability of such an arrangement as is evidenced from a consideration of the reading operation of both of the methods above noted.

A signal from a reading head indicating a transition from a "0" condition to a "1" condition is available some little time before a cell is at a point with respect to the head where the writing operation normally takes place, that is, the "1" condition is read at the leading edge of the curve representing the localized magnetization in the cell. The reading in fact is accomplished between the cell being read and the cell immediately preceding. In the return-to-zero method noted above, the cell spacing must be sufficiently large to permit individual reading of each cell. Thus, if a succession of "1's" has been recorded in successive cells, each transition from a "0" condition between the cells to a "1" condition within the cells must be detectable by the reading head. This fact then presents a restriction on any reduction in the intercell spacing with a view toward increasing drum storage capacity.

In the non-return-to-zero method no separate detection of a succession of "1" conditions is possible; the initial transition from the "0" magnetic condition to the first of the succession of "1" conditions with the final transition from the "1" condition of the last of the succession of "1's" to the normal "0" condition is all that is available to read out the succession of "1's." In this case, therefore, it is necessary for associated register circuits to remember the magnetic condition of a previously read cell in order to recognize a signal read out. That is, the reading of any cell is dependent upon the reading of the immediately preceding one and arbitrary reading of any particular cell is not feasible. In addition to the disadvantage noted, it is also strictly necessary for an accurate reading of the information stored in a track that an initial transition from a "0" magnetic condition to a "1" magnetic condition not pass undetected by subsequent components, such as amplifiers. In that event, subsequent reading of the succeeding cells would obviously be erroneous since no further change of flux appears in the head until the termination of the succession of "1's" is reached. Reading, therefore, in this method is of questionable reliability. The burdens imposed by the disadvantages inherent in an non-return-to-zero method of recording thus impose an intolerable burden upon associated circuitry for many magnetic drum storage applications in spite of the advantage gained in terms of increased drum capacity. It is readily seen that both of the two commonly employed methods of recording as described above are limited in the extent to which the cells can be packed.

It can be shown that in the non-return-to-zero method the cell size may be reduced to approximately half that of the cell size in the return-to-zero method. The size of the cell itself is largely determined by considerations such as the composition of the magnetic storage medium, the separation of the recording and reading head tips and the storage medium, and the magnetic retentivity of the magnetic medium, and the storage drum capacity is effectively determined by these parameters.

Accordingly, it is an object of this invention to record information on a movable magnetic medium in a manner which will permit a substantial increase in the amount of information storable in a medium of a given dimension over recording means heretofore known without an attendant sacrifice of reliability in reading out such information.

It is another object of this invention to increase the amount of information which may be stored in a given cell of a movable magnetic information storage medium.

A still further object of the present invention is an improved method for utilizing localized magnetizations in a storage medium to represent information which it is desired to store in the medium.

An aspect of this invention contributing to the realization of the foregoing objects is a record-read head arrangement in which two heads are associated with a given cell, both of which heads are employed to record an informational bit in a cell and only one of which is used to read out information so recorded.

In the recording arrangement in accordance with one specific illustrative embodiment of this invention a three-condition or ternary cell is utilized having associated therewith two recording heads separated by a minor fraction of the cell dimension. In the recording operation both heads are used simultaneously to write a single informational bit. One of the heads is used to read the information which is stored in the form of two localized magnetizations of predetermined polarity. Thus, if a magnetization which may be designated as a plus is recorded immediately preceding another magnetization designated as a minus in a single cell by means of the simultaneous energization of the two heads, a negative magnetic slope will exist between the two magnetizations in the cell. On the other hand, if a minus magnetization is recorded immediately preceding a plus magnetization, a positive magnetic slope will exist between the two magnetizations in the cell. Finally, if both magnetizations induced by the two heads are of like polarity, a zero magnetic slope will exist between the two magnetizations in the cell. The head used also as a reading head will then read the magnetic slope as indicated above. Thus, a positive magnetic slope may be used to induce a plus pulse, a negative slope a minus pulse and a zero slope may be used to induce a condition of absence of pulse. In accordance with an aspect of the present invention, the information is read out at a point entirely within the cell, that is, the character of the information is determined midway between the two magnetizations within the cell thereby making possible a closer spacing between adjacent cells without affecting the information read out of the immediately following cells. Additionally, with each cell containing one of three available conditions to represent an informational bit, fewer cells will be required to store representational information than is the case in a binary system where only two conditions are available.

The arrangement of the present invention readily finds application in systems handling ternary information such as, for example, telegraphic signaling systems. Arrangements in which binary coded information is translated into ternary coded information preparatory to transmission over telegraphic communication circuits and logic systems employing ternary or three-state logic are exemplary of systems wherein storage of ternary information may be required.

It is a feature of this invention to record information on a magnetizable surface by the relative magnetic states of a pair of spots or magnetizations of the surface within a single cell.

It is another feature of this invention to employ a pair of magnetic recording heads closely adjacent each other and a movable magnetizable surface, input circuitry being connected to the heads to induce particular combinations of pairs of magnetizations to record information on the surface.

It is still another feature of this invention to read information from a magnetizable surface by ascertaining the change in polarity of magnetization between two spots within a single cell on that surface.

It is a further feature of this invention to position a pair of magnetic recording heads closely adjacent each other and a movable magnetizable surface and to record information in particular cells on the surface by applying current through the windings on the two heads in series to record one state and in parallel to record other states of information.

It is a still further feature of this invention to connect a pair of impedances across the ends of the two windings, the impedance providing series or parallel connections for the two windings on the two heads, depending on the input conductor energized.

A complete understanding of this invention and its mode of operation together with the above and other objects and features may be gained from a consideration of the detailed description which follows in conjunction with the accompanying drawing, in which.

Figure 1:
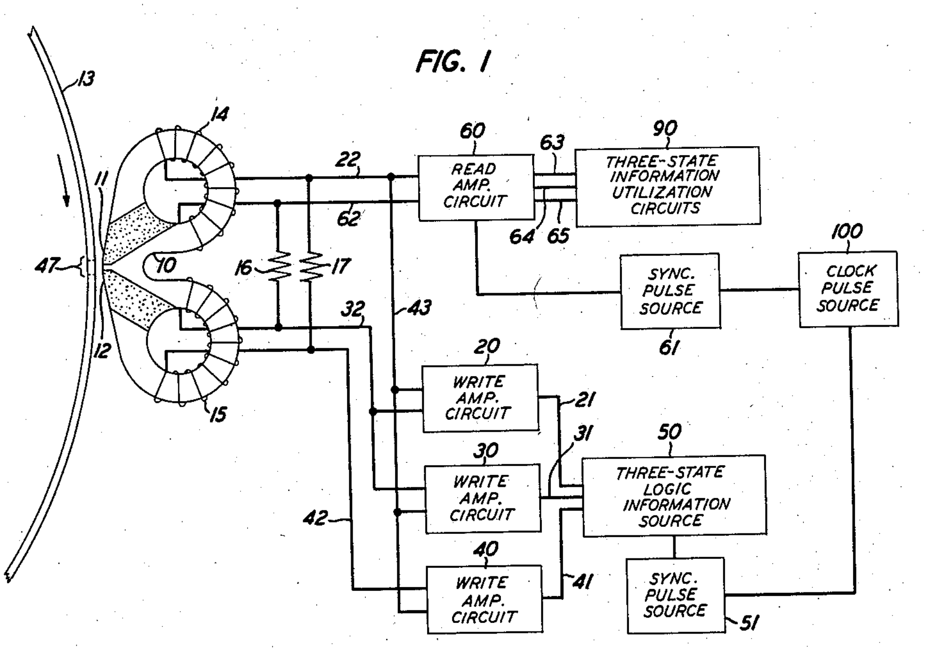
Fig. 1 is a block diagram of one specific illustrative embodiment of this invention showing particularly the interconnection of the recording input circuits and the reading circuits with the windings of a pair of heads.

In one specific illustrative embodiment of this invention as shown in Fig. 1 a transducer 10 provided with a pair of heads 11 and 12 is associated in spaced proximity with a magnetizable surface 13 which preferably is the peripheral surface of a magnetic drum. The surface 13 may be considered to be divided into a number of discrete areas or cells 47 one of which is represented opposite the heads 11 and 12, which cells individually will confine each element of information to be stored. Although any of the known means for effecting localized magnetizations on a magnetizable surface may be employed to accomplish the recording of this invention, the requirement that the heads be closely spaced makes the use of the unitary transducer disclosed in the patent of F. G. Buhrendorf, No. 2,658,114, dated November 3, 1953, highly suitable. Magnetic drums and their driving means of the character with which the present invention may be advantageously used are well known in the information storage art and need not here be described.

A pair of windings 14 and 15 are wound on individual sections of a unitary core in such a manner that the winding 14 is associated with the head 11 and the winding 15 is associated with the head 12. Bridging opposite terminals of the windings 14 and 15 are resistors 16 and 17, which resistors together with the associated windings constitute a network for the proper distribution of transducer energizing current as hereinafter to be described. Write amplifying circuits 20, 30 and 40 provide the means whereby selective input signals on the respective input leads 21, 31, 41, may be applied via the conductors 22, 32 and 42, to transducer windings 14 and 15. Input signals comprising current pulses of required polarity are supplied by a three-state logic information source 50 of a type known in the information storage art in accordance with coded information it is desired to store. The input pulses are supplied by the source 50 under the timing control of synchronizing pulses from a source 51 which in turn may be temporally controlled by a common clock pulse generator 100.

Connected across the winding of either head of the transducer 10 by means of the conductors 22 and 62 is a read amplifying circuit 60. Although either head may be employed for this purpose, in the depicted embodiment of this invention the head 11 is so utilized. Output pulses are supplied by the read amplifying circuit 60 to its several output leads 63, 64, and 65 in accordance with the coded information stored in the surface 13 and read out by the head 11. These output pulses are properly gated by synchronizing pulses from a source 61 also under the temporal control of timing pulses from the common clock pulse generator 100.

This invention, providing as it does for a three-state notation, employs three write amplifying circuits, any one of which may be energized from the controlling source 50 to in turn energize the heads 11 and 12. The three discrete electrical states which provide the variant elements for representing each information bit to be stored are positive, negative and zero states. Each of the input leads 21, 31 and 41 then, may be uniquely associated with one of these states, and for purposes of description, the leads 21, 31 and 41, will be here associated with the positive, negative and zero states, respectively.

Figure 3:
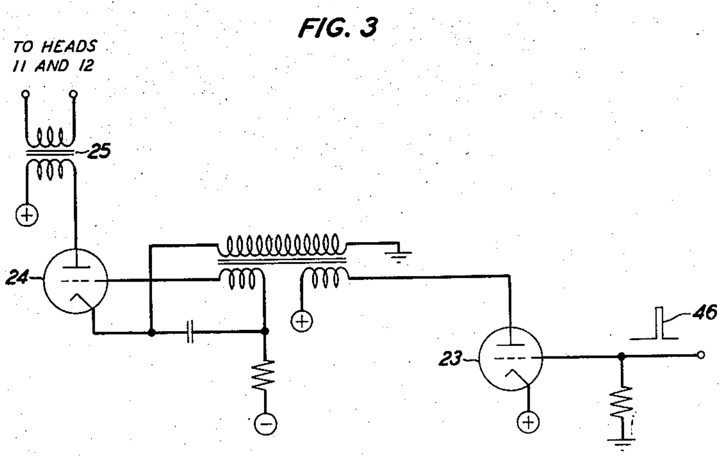
Fig. 3 shows an illustrative input circuit suitable for energizing the heads to accomplish the recording operation of this invention.

A write amplifying circuit which may be most advantageously employed to selectively apply energizing currents to the heads 11 and 12, is shown in Fig. 3 and it is to be understood that this circuit is employed for each of the stages 20, 30 and 40. This circuit comprises a trigger tube 23 and a normally quiescent blocking oscillator including a tube 24, the output of the circuit being applied to the heads 11 and 12 through a transformer 25. The organization and operation of this circuit is described in detail in connection with the copending application of W. A. Cornell et al., Serial No. 307,108, dated August 29, 1952, and need not be repeated here.

As shown in Figs. 1 and 3, when an information bit represented by a zero electrical state is to be stored in a cell, a positive-going pulse 46 properly timed by a synchronizing pulse from the synchronizing pulse source 51 under the control of clock pulse source 100 is applied via the lead 41 from the logic information source 50 to the write circuit 40. This positive-going pulse 46 triggers the tube 23, the conduction of which initiates conduction in the oscillator tube 24 where the pulse 46 is amplified and applied to the output terminals of the amplifying circuit 40 through the transformer 25. The energizing pulse will be applied to the heads 11 and 12 from the circuit 40 by way of the conductor 42, the winding 15, resistor 16, the winding 14, conductor 22, and returned to the circuit 40 by way of the conductor 43. The polarity of the flux induced in each of the heads 11 and 12 by the current passing through the windings 14 and 15 will be determined by the direction of the current in each winding and the sense in which each of the heads is wound. Assuming the sense of the windings as shown in Fig. 1 of the drawings, a flux of like polarities will be induced in each of the heads 11 and 12 by the current following the path described immediately preceding. Although a like flux in either polarity will be effective to store the particular information bit represented by a zero electrical state, in the preferred embodiment of this invention, the current direction and windings are arranged in a manner such as to cause the heads 11 and 12 to induce a pair of localized magnetizations of what may be termed positive polarities in a cell 47 during the time that the cell 47 is opposite the heads 11 and 12.

Figure 2:
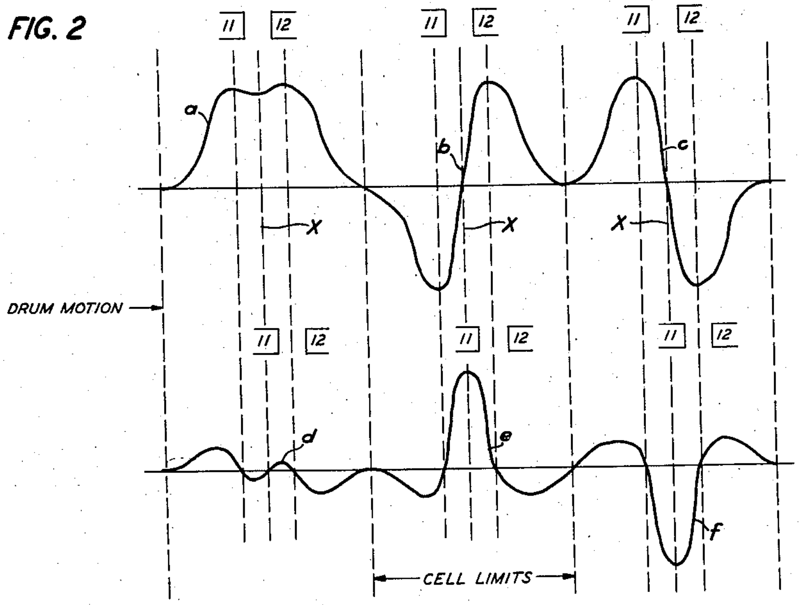
Fig. 2 is a graphical representation of the flux pattern existing in a given cell for each of the possible storage conditions in accordance with this invention and the corresponding output signal read out for each condition.

A graphical representation of the flux density in a cell along the line of the track is shown in Fig. 2. The flux pattern represented by the curve *a* induced by the recording heads 11 and 12 to record an information bit represented by a zero electrical state and the position of the recording heads 11 and 12 at the instant of writing is illustrated. It will be noted that the slope of the curve at a point midway between the curves representing the positively poled magnetizations within the cell is zero.

When an information bit represented by a positive electrical state is to be stored in a cell, a positive-going, properly timed pulse supplied from the logic information source 50 is applied via the lead 21 to the write amplifying circuit 20, wherein the pulse is amplified and applied through the transformer 25 to the output terminals of the write circuit. The amplified energizing pulse will then be applied to the windings 14 and 15 by way of the conductor 43 and conductor 22. To energize the windings 14 and 15 the current is divided, one portion passing through the winding 14 in one direction and a resistor 16, another portion of the current passing through the resistor 17 and the winding 15 in the opposite direction and then return to the circuit 20 via conductor 32. Since the energizing current pulse for the heads 11 and 12 in this case is passed through the windings 14 and 15 in opposite directions and assuming the sense of the windings as above indicated, the heads 11 and 12 will be energized to induce a flux of opposite polarities in a cell 47. It will be assumed that the windings 14 and 15 are arranged in a manner such that the first magnetization in the cell 47 will be one which may be considered negatively poled and the magnetization induced by the head 12 will be one which may be considered positively poled.

Referring again to the graphical representation of Fig. 2, and specifically to curve *b*, it will be seen that a positive slope exists at a point midway between the curves representing the magnetizations within the cell.

When an information bit represented by a negative electrical state is to be stored in a cell, a positive-going pulse 46, also properly timed by a synchronizing pulse from the synchronizing pulse source 51, is supplied by the logic information source 50 and applied through the input lead 31 to the write amplifying circuit 30. An amplified energizing pulse is then applied to the output terminals of the circuit through the transformer 25 and conducted via the conductor 32 to the windings 14 and 15. The current is again divided, a portion passing through the winding 15 in one direction and the resistor 17, another portion of the current passing through the resistor 16 and the winding 14 in the opposite direction and thereupon through the conductors 22 and 43 is returned to the amplifying circuit 30. Thus, the current through the windings 14 and 15 for the latter information bit also passes through the windings 14 and 15 in opposite directions, but oppositely to the directions in which the current passed through these coils in writing an information bit represented by a positive-going state. Referring again to the graphical representation of Fig. 2, and specifically to curve *c*, it will be seen that a negative slope exists between a point midway between the curve representing the magnetizations within the cell.

No separate reading heads are provided in the present invention to read out the information bit stored in a cell, one of the pair of heads 11 and 12 being employed for this purpose. Here, the head 11 and its associated winding 14 is also connected, by means of the conductors 22 and 62, to a read amplifying circuit 60 which in turn is connected to three-state information utilization circuits 90 by means of the conductors 63, 64 and 65. When the reading operation is to be accomplished movement of the surface 13 with respect to the transducer 10 and specifically the head 11 is in the direction as indicated in Fig. 1. The reading operation of the head 11 is accomplished midway between the magnetizations present within a cell, that is, at a point where the greatest change, if any, exists between the polarities of the magnetizations.

Figure 4:
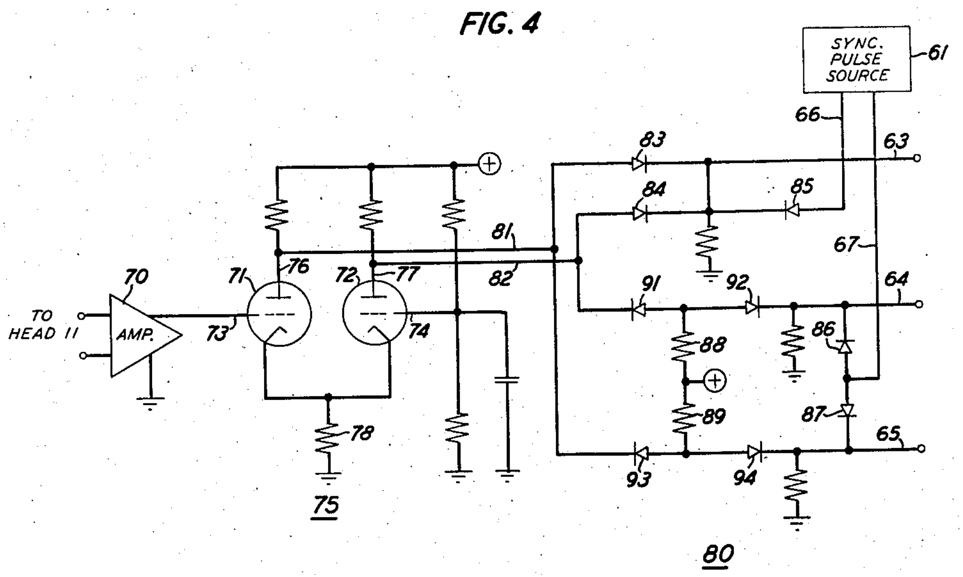
Fig. 4 shows an illustrative output circuit suitable for delivering any one of three output pulses responsive to a particular ternary condition read by the reading head.

When the cell 47 passing the head 11 during the reading operation has contained within it a pair of magnetizations of the polarity representative of a zero electrical state virtually no flux change will be present between the two magnetizations and a current variation of substantially negligible magnitude will be induced in the coil 14. Due, however, to the displacement of the magnetizations in the cell, a minor difference in flux will exist between the two magnetizations as may be observed as represented by a slight dip in the curve *a* of Fig. 2. The small current variation is also shown in Fig. 2 as the wave form *d*. The small current variation represented by *d* will, for practical purposes, be considered as a substantially zero signal applied to the read amplifying circuit 60, since, as it will be seen, this condition will have no effect upon the desired output signal representing a zero electrical state. As depicted in Fig. 4, the read amplifying circuit 60 is comprised of an amplifier stage 70 of a known type possessing essentially linear characteristics, a cathode-coupled inverter stage 75, and a three-stage recognition stage 80 supplying the output terminals 63, 64, and 65. Signals applied by the conductors 22 and 62 to the read circuit 60 are amplified in the amplifying stage 70 and applied to the grid 73 of the first tube 71 of the normally conducting tubes 71 and 72. The plates 76 and 77 will normally be at substantially like potentials, remaining at these potentials until either tube is caused either to increase or decrease its conduction. Referring again to Fig. 4, when the passage of a cell 47 containing magnetizations of like polarities opposite the head 11 fails to induce a significant current in the winding 14, no signal will be applied to the grid 73 and the plates 76 and 77 will remain at like potentials. These potentials of substantially equal value will be applied via the conductors 81 and 82 to the recognition circuit 80, each section of which constitutes essentially a negative And gate. Assuming a normal potential on the conductor 66 supplied from the source 61 to be of a value substantially higher than that of the normal values of plates 76 and 77, the varistors 83 and 84 will be reverse-biased and the output terminal 63 will be at a potential equal to that supplied by the conductor 66. When a negative-going pulse is applied via the conductor 66, the potential on the terminal 63 will follow this pulse thereby indicating a condition of no signal on the grid 73 of the tube 76 at the time of the applied negative-going pulse from the synchronizing pulse source 61. Thus, when the head 11 during the reading operation detects in a cell 47 a magnetic condition of no polarity change, there will be no effect on the read amplifying circuit 60 and an output pulse is provided by the synchronizing pulse source 61 to indicate this condition.

Assuming next the reading from a cell 47 of an information bit represented by a positive electrical state by the head 11, a current pulse having a wave form as shown as *e* in Fig. 2 will be induced in the winding 14 by the flux having a corresponding density as graphically represented by the curve *b* in the same figure. This current pulse *e* will be amplified in the amplifier 70 and, assuming a negative output from the amplifier 70, will be applied in that polarity to the grid 73. Tube 71 will thereupon move toward cut-off with the result that the tube 72 will conduct more heavily due to the bias provided by the resistor 78. The potential on the plate 76 and conductor 81 will now increase and the potential on the plate 77 and the conductor 82 will decrease in value.

Between negative-going pulses applied to the conductor 67 from the synchronizing pulse source 61, both of the output terminals 64 and 65 uniquely associated with the positive and negative states, respectively, will be held at a potential substantially equal to that of the normal state of the plates 76 and 77 by a potential also applied by the source 61 via the conductor 67 through the forward biased varistors 86 and 87, respectively. The varistors 91 and 92, and 93 and 94 of the positive and negative stage And gates, respectively, will be reverse-biased by a suitable potential applied through the resistors 88 and 89, respectively. Neither of the output terminals 64 or 65 will therefore drop below its normal potential in the absence of a negative-going potential simultaneously applied on either one of the conductors 81 or 82 and the conductor 67 to overcome the reverse bias applied through the resistors 88 and 89. This negative-going potential is applied by the conductor 81 when a positive signal is applied to the grid 73 simultaneously with a properly timed negative-going synchronizing pulse from the pulse source 61 on the conductor 67. A negative-going pulse thereupon appears on the conductor 64 uniquely associated with the positive electrical state indicating that an information bit represented by a positive electrical state was contained within the cell instantly read. During the application of the synchronizing pulse from the source 61, the terminal 65 is held at its normal potential by the potential applied through the resistor 89 and the varistor 94, the varistor 93 continuing to be reverse-biased by the positive-going potential on the conductor 81.

When an information bit represented by a negative electrical state is read from a cell 47 by the head 11, a negative current pulse having a wave form as shown as *f* in Fig. 2 is induced in the winding 14 by the flux in the cell. The flux density is graphically shown at *c* in Fig. 2 together with its temporal relationship to the current pulse *f* induced. This current pulse *f*, after amplification in the amplifier 70 will appear as a positive signal on the grid 73. The action of the inverter stage 75 will now be reversed, a negative-going potential appearing on the conductor 81 and a positive-going potential appearing on the conductor 82. The negative-going pulse on the conductor 81 will now bias the varistors 93 and 94 in a forward direction and a simultaneous negative-going pulse supplied via the conductor 67 by the source 61 will cause a corresponding negative-going pulse to appear on the output terminal 65 uniquely associated with the negative-electrical state thereby indicating that the cell being read has stored therein an information bit represented by that state. During the reading of a positive or negative state stored in a cell, although a positive-going potential may be applied to either varistor 83 or 84, the potential on the output terminal 63 will be maintained at its normal level by the source 61 through the conductor 66 and the varistor 85.

Because of the fact that the windings 14 and 15 are connected in bridge fashion, the unused head for reading purposes, here the head 12, will also respond to the flux patterns in the cells. However, the values of the resistors 16 and 17 shown in Fig. 1 may be so chosen with respect to the impedance of the winding 15, that this response will be attenuated to the point of being negligible. Specifically in one illustrative embodiment wherein the windings 14 and 15 presented impedances of between 40 and 50 ohms, the resistors 16 and 17 were each 150 ohms.

Since the reading head is responsive to changes in magnetic polarity between the pairs of magnetizations in a cell and not to the excursion of the flux pattern itself, the reading operation can be accomplished without regard to the magnetic base of the surface 13. Thus, the surface 13 may be magnetically neutral or it may be magnetized to saturation in either direction. In any case, it is only necessary that the reading operation be accomplished midway between the magnetizations in a cell, that is, as shown in Fig. 2, at the points "X" in time.

It is to be understood that the above-described arrangements are illustrative of the application of the principles of the invention. Numerous other arrangements may be devised by those skilled in the art without departing from the spirit and scope of the invention.

What is claimed is:

1. In a memory device having a rotatable drum having magnetizable areas on the periphery of said drum, a pair of recording heads, said heads adapted to be successively associated with said areas as said drum is rotated, a plurality of input circuits, means for interconnecting each of said heads with each of said input circuits in predetermined combinations, each of said input circuits being selectively and successively energizable to cause said heads to simultaneously induce a pair of magnetizations in each of said areas as said drum is rotated, an output circuit, and means including one of said heads responsive to said pair of magnetizations in each of said areas for successively inducing particular electrical conditions in said output circuit as said drum is rotated.

2. In a memory device as claimed in claim 1 wherein said pairs of magnetizations each comprise combinations of alternate opposite polarities and like polarities, and said particular electrical conditions comprise corresponding signals of alternate opposite electrical polarities and zero signals, respectively.

3. In an information storage arrangement, a rotatable drum having a plurality of cells in the periphery thereof, a first and a second head associable with said cells, and means for simultaneously energizing said heads to record a first and a second magnetic spot of a particular combination of polarities in one of said cells; said means comprising a plurality of input circuits and means for interconnecting each of said heads with each of said input circuits in predetermined combinations.

4. A storage circuit comprising a movable magnetizable surface, a pair of magnetic recording heads closely adjacent each other and said surface, said heads having windings thereon, a plurality of circuit means interconnecting said windings in series and in parallel, and means for selectively applying current to said circuit means.

5. A storage circuit comprising a movable magnetizable surface, a pair of magnetic recording heads closely adjacent each other and said surface, said heads having windings thereon, first circuit means for connecting said windings in series, first means for applying current to said first circuit means to induce one pair of magnetizations on said surface, second circuit means for connecting said windings in parallel, and second means for applying current to said second circuit means to induce a different pair of magnetizations on said surface.

6. A storage circuit in accordance with claim 5 wherein said first and second circuit means include a pair of impedances connected across the ends of said pair of windings.

7. A storage circuit comprising a movable magnetizable surface, a pair of magnetic recording heads closely adjacent each other and said surface, each of said heads having a winding thereon, first circuit means for connecting said windings in series, second circuit means for connecting said windings in parallel, means for applying current to said first circuit means to induce a pair of magnetizations of like polarity on said surface, and means for applying current to said second circuit means to induce pairs of magnetizations of unlike polarity on said surface.

8. A storage circuit comprising a movable magnetizable surface, a pair of recording heads closely adjacent each other and said surface, each of said heads having a winding thereon, a pair of impedances across said windings, a plurality of circuit means including said pair of impedances for interconnecting said windings in series and in parallel, and means for selectively applying current to particular ones of said plurality of circuit means and said windings to cause said heads to induce distinct pairs of magnetic states on said surface.

9. A storage circuit comprising a movable magnetizable surface, a pair of magnetic recording heads closely adjacent each other and said surface, each of said heads having a winding thereon, a pair of impedances connected across the ends of said windings, said ends defining a plurality of input conductors, means connected to a first of said input conductors for applying current through said windings in series to induce a pair of magnetizations of like polarity on said surface, means connected to a second of said input conductors for applying current in one direction through said windings in parallel to induce a first pair of magnetizations of unlike polarity on said surface, and means connected to a third of said input conductors for applying current in the opposite direction to said windings in parallel to induce the opposite pair of magnetizations of unlike polarity on said surface.

10. A storage circuit in accordance with claim 9 further comprising a read-out circuit connected across one of said windings, said read-out circuit including means for detecting a change in polarization between the first and second of each pair of magnetizations.

11. A storage system comprising a movable magnetizable surface, a pair of recording heads closely adjacent each other and said surface, a plurality of windings on said heads, circuit means for alternatively connecting said plurality of windings in series and in parallel, and means including said circuit means for applying current to said windings simultaneously to determine the magnetizations of two closely adjacent spots on said surface in accordance with said series and parallel connecting of said windings.

12. A storage system in accordance with claim 11, further comprising output means connected to one of said heads for detecting a change in magnetization between the first and the second of said spots.

13. In a memory device, a magnetic storage medium, a pair of recording heads, a plurality of input circuit means, means for interconnecting each of said input circuit means with each of said recording heads in predetermined combinations, and means for selectively energizing said plurality of input circuit means, said pair of recording heads being simultaneously responsive to the energization of any one of said input circuit means in accordance with a particular element of information to be stored.

14. In a memory device, a magnetic storage medium, a plurality of recording heads, a plurality of input circuit means, means for interconnecting each of said recording heads with each of said input circuit means in predetermined combinations, and means for selectively energizing said plurality of input circuit means, said plurality of recording heads being simultaneously responsive to the energization of any one of said input circuit means in accordance with a particular element of information to be stored.

15. In a memory device, a rotatable magnetic drum, a pair of recording heads associated with said drum, a plurality of input circuits, means for interconnecting each of said recording heads with each of said input circuits in predetermined combinations, means for selectively energizing said plurality of input circuits, said pair of recording heads being simultaneously responsive to the energization of any one of said input circuits to induce pairs of magnetizations of a particular combination of polarities on said drum, and reading means including one of said heads.

16. In an information storage arrangement the combination as claimed in claim 3 further including reading means comprising one of said heads, output circuit means connected to said reading means, and means for rotating said drum, said one head being responsive to changes in said magnetic polarities to induce particular electrical conditions in said output circuit as said drum is rotated.

References Cited in the file of this patent

UNITED STATES PATENTS

| | | |
|---|---|---|
| 2,700,148 | McGuigan et al. | Jan. 18, 1955 |
| 2,734,186 | Williams | Feb. 7, 1956 |